T. B. DORNIN.
APPARATUS FOR TESTING FLUID METERS.
APPLICATION FILED MAR. 5, 1908.
899,959.
Patented Sept. 29, 1908.
2 SHEETS—SHEET 1.
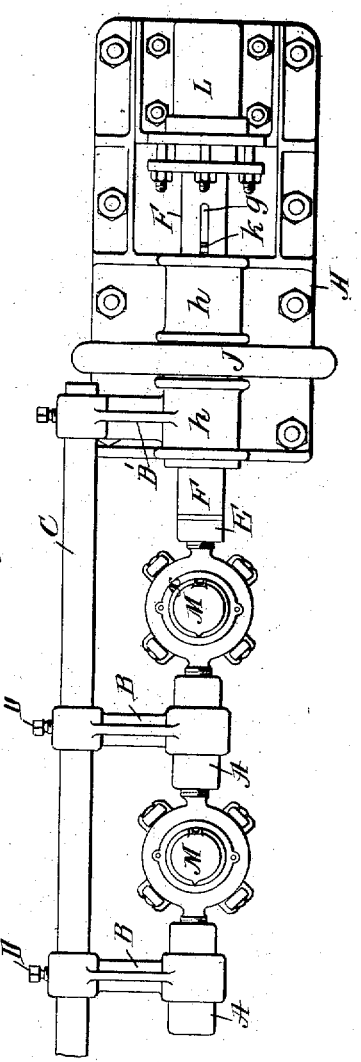
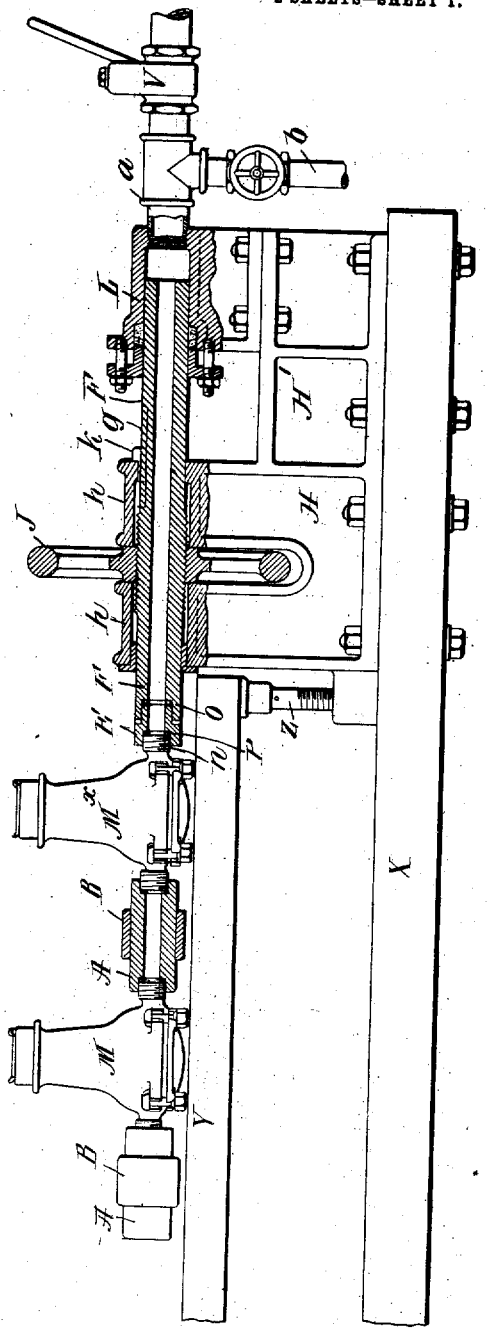
Witnesses
Samuel E. Wade
Edw. W. Byrn
Inventor
THOMAS B. DORNIN.
By Attorney Munn & Co.

T. B. DORNIN.
APPARATUS FOR TESTING FLUID METERS.
APPLICATION FILED MAR. 5, 1908.
899,959.
Patented Sept. 29, 1908.
2 SHEETS—SHEET 2.
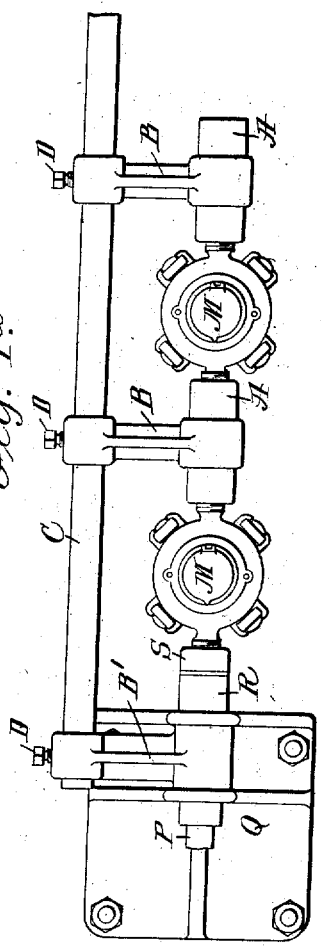
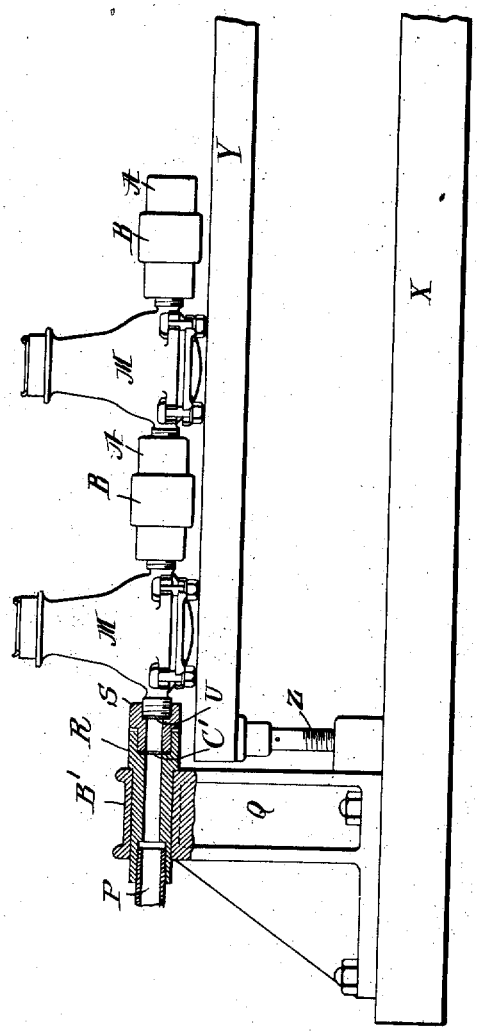
Witnesses
Samuel E. Wade
Edw. W. Byrn
Inventor
Thomas B. Dornin.
By Attorney
Munn & Co.

UNITED STATES PATENT OFFICE.

THOMAS B. DORNIN, OF NORFOLK, VIRGINIA, ASSIGNOR OF ONE-HALF TO JACOB M. UMSTADTER, OF NORFOLK, VIRGINIA.

APPARATUS FOR TESTING FLUID-METERS.

No. 899,959.     Specification of Letters Patent.     Patented Sept. 29, 1908.

Application filed March 5, 1908. Serial No. 419,299.

*To all whom it may concern:*

Be it known that I, THOMAS B. DORNIN, a citizen of the United States, residing at Norfolk, in the county of Norfolk and State of Virginia, have invented a new and useful Improvement in Apparatus for Testing Fluid-Meters, of which the following is a specification.

In the operation of testing fluid meters, such as water meters and the like, for the purpose of determining the accuracy, or estimating the error of the same, it is necessary to temporarily couple up the inflow and outflow nipples of the meter to a supply pipe, so that water taken from the supply pipe flows through the meter, registering on the dial the effect of its passage, and discharging thence into a measuring tank, the volume of water in which tank is then compared with the registration on the dial of the meter for determining its accuracy or error.

The fitting up of each meter to water tight connection with the supply pipe and measuring tank is, where a large number of meters are to be tested, a slow and tedious operation, and my invention is designed to provide an apparatus whereby a large number of meters may be simultaneously connected with tight joints to the supply pipe and measuring tank, and the meters all tested at once with a great saving of time and labor.

To that end my invention consists in the novel construction and arrangement of parts of a specially designed apparatus, as will be hereinafter more fully described with reference to the drawings, in which Figure 1 is a plan view and Fig. 2 a vertical longitudinal section of the right hand, or supply, end of the apparatus, showing two of the meters in position and Figs. 1ª and 2ª are similar views of the left hand, or discharge, end of the apparatus.

The complete apparatus will be shown by juxtaposing Figs. 1 and 2 in longitudinal and coaxial alinement with Figs. 1ª and 2ª. Figs. 1ª and 2ª being placed to the left of Figs. 1 and 2.

In the drawing, X represents a suitable base plate upon which is bolted at one end the metal frame H, and at the other end the bracket standard Q. Between the frame H and the standard Q is disposed a level table Y supported upon adjusting screws Z and arranged to sustain temporarily in a straight row any desired number of meters M during the operation of testing.

The frame H has an offsetting step H' supporting a stuffing box L, into which is tapped the supply pipe *a* for supplying water from the water main. The frame H has two collars *h h* through which an adjustable hollow sleeve F is operated longitudinally by means of a hand wheel nut J screw threaded interiorly and meshing with a thread on the sleeve F. In the end of the sleeve F is inserted a bushing E, made water-tight by a washer O, and counterbored so that the meter nipple *n* can be easily inserted therein. The joint between the bushing E and meter nipple is made water-tight by means of a washer P.

Between each set of meters M there is a longitudinally movable slip sleeve A, supported by and loose in an arm B, which projects at right angles to and is supported by a horizontal rod C, and set bolt D, the rod being supported by arms B' from the end frame H and standard Q.

A key *k*, fixed in one of the collars *h* slides in a longitudinal groove *g* in the adjustable sleeve F, as the latter moves longitudinally from the action of wheel nut J, said key and groove serving to prevent the sleeve F from turning.

At the outlet end of the last meter, see Figs. 1ª and 2ª, the meter nipple is fitted in a bushing S, and is made watertight in the same by a washer U. The bushing S, is inserted in a stationary sleeve R, which extends through a bearing in the standard Q and is shouldered against the same the bushing S being made watertight in the sleeve R by a washer C'. Into this sleeve R, the discharge pipe is tapped. This pipe P discharges into a measuring tank through outlets of the desired size.

The operation of my testing apparatus is as follows: For setting the meters in position the adjustable sleeve F, is set back towards the supply end by hand-wheel J, and the meter at the discharge end (Figs. 1ª and 2ª) is first inserted in bushing S, the first sleeve A, is then slipped up on to the meter nipple and the nipple of the next meter is inserted in the other end of the first sleeve, after which a second sleeve A is slipped up on to the nipple of this meter, and so on until all meters have been set with their nipples in coaxial alinement. The adjustable sleeve F, (Figs. 1 and 2) is then set up to the last placed meter M⁴, by hand-wheel J, and adjusted by this hand-wheel until sufficient pressure has been exerted on all the washers of all the coaxial connections of the meters to make all joints water-tight. Water is then let into and through the meters by valve V in supply pipe *a* until it discharges into tank. Water is then cut off at the discharge end, and the meters read and tank balanced. The proper stream is then turned on until the desired quantity of water has passed into the tank, at which time water is cut off at the discharge end and the meters examined for the final reading. The difference between the meter readings and the tank reading gives the per cent. of error. When the tests are completed, water is shut off at the supply end by valve V and the meters and pipe drained through branch pipe *b* and its valve which are placed between the supply pipe and the coaxial clamping devices. To remove the meters, the adjustable sleeve F is set back by the hand-wheel into the slip connection of the stuffing box and the meter nearest the sleeve F is taken out. The next sleeve A, is then slipped back and the next succeeding meter taken out, and so on until all meters are taken out.

The important value of my invention is to be found in the slip sleeve A, by means of which any number of meters may be set in series and all joints between the meters and sleeves made water-tight at one operation through exerting pressure, by suitable means, on one end meter, the other end being held stationary by a suitable abutment.

The advantages claimed are that by one operation the joints between all meters and sleeves are made water-tight, thus obviating the necessity of separate operations for making the joints water-tight at each meter.

I claim—

1. An apparatus for testing meters, comprising a series of longitudinally slidable sleeves, means for holding the same in coaxial alinement and means for clamping the inlet and outlet orifices of the meters against the coaxially alined sleeves, said means consisting of a stationary abutment at one end and a longitudinally adjustable sleeve at the other end arranged coaxially to the other sleeves and having external screw threads and an interiorly screw threaded nut engaging the threads of the sleeve and means for restraining the nut against longitudinal movement with the threaded sleeve.

2. An apparatus for testing meters, comprising a series of longitudinally slidable sleeves, means for holding the same in coaxial alinement and means for clamping the inlet and outlet orifices of the meters against the coaxially alined sleeves, said means consisting of a stationary abutment bearing at one end, an externally screw threaded and longitudinally adjustable sleeve at the other end, an interiorly screw threaded hand wheel nut and a frame with restraining collars on opposite sides of said hand-wheel nut.

3. An apparatus for testing meters, comprising a series of longitudinally slidable sleeves, a shaft, a series of laterally extending arms on said shaft for holding said sleeves in coaxial alinement, means for clamping the inlet and outlet connections of the meters against the coaxially alined sleeves, said means consisting of a stationary abutting bearing at one end, and a longitudinally adjustable sleeve at the other end having a passageway for the water through it, said sleeve having external screw threads, an interiorly screw threaded nut arranged to engage the threads on said sleeve, said nut being provided with a hand wheel for operating the same, and a collar on each side of said nut for supporting said adjustable sleeve.

THOMAS B. DORNIN.

Witnesses:
G. M. PAYNE,
I. B. LOAG, Jr.